(12) United States Patent  
Nguyen et al.

(10) Patent No.: US 10,250,798 B2
(45) Date of Patent: *Apr. 2, 2019

(54) ENABLEMENT AND DISABLEMENT OF CAMERAS (71) Applicant: Hewlett-Packard Development Company, L.P., Houston, TX (US)

(72) Inventors: Nam H Nguyen, Houston, TX (US); Michael Durham, Tomball, TX (US); Mark Piwonka, Tomball, TX (US); Greg Franke, Magnolia, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,236

(22) Filed: Aug. 13, 2018

(65) Prior Publication Data

US 2018/0352147 A1    Dec. 6, 2018

Related U.S. Application Data (63) Continuation of application No. 15/506,623, filed as application No. PCT/US2014/052855 on Aug. 27, 2014, now Pat. No. 10,051,176.

(51) Int. Cl.
*H04N 5/232* (2006.01)
*G06F 21/70* (2013.01)
(Continued)

(52) U.S. Cl.
CPC ....... *H04N 5/23216* (2013.01); *G06F 9/4401* (2013.01); *G06F 21/572* (2013.01);
(Continued)

(58) Field of Classification Search
CPC combination set(s) only.
See application file for complete search history.

(56) References Cited

U.S. PATENT DOCUMENTS 6,501,380 B1    12/2002  Jakobsson
7,548,255 B2     6/2009  Bear et al.
(Continued)

FOREIGN PATENT DOCUMENTS

EP    2635020        9/2013
KR    20080060046   12/2006
KR    10-0872050 B1 12/2008

OTHER PUBLICATIONS

Anonymous: "Lenovo Thinkpad M588 turning off the Integrated Camera & routine Ramblings", Nov. 29, 2889 (Nov. 28, 2889), XP855458922, Retrieved from the Internet: URL:https://vmkombath.wordpress.com/2889/1.

(Continued)

*Primary Examiner* — Paul M Berardesca
(74) *Attorney, Agent, or Firm* — HP Inc. Patent Department (57) ABSTRACT

Examples of an apparatus, method, and instructions included on a machine-readable non-transitory storage medium are disclosed herein. In an example of the method, a first state is provided to enable a camera to record an image, a second state is provided to disable the camera, and a third state is provided to permit the camera to be enabled and disabled. Also in this example of the method, a button is actuated in the third state to an on position to enable the camera to record an image or an off position to disable the camera. Additionally in this example of the method, a signal is generated via an input device in the on position of the button to enable the camera to record an image or disable the camera.

15 Claims, 7 Drawing Sheets

(51) Int. Cl.
- *H04N 5/77* (2006.01)
- *G06F 21/82* (2013.01)
- *H04N 5/225* (2006.01)
- *G06F 9/4401* (2018.01)
- *G06F 21/57* (2013.01)
- *G06F 21/62* (2013.01)

(52) U.S. Cl.
CPC .......... *G06F 21/575* (2013.01); *G06F 21/629* (2013.01); *G06F 21/70* (2013.01); *G06F 21/82* (2013.01); *H04N 5/225* (2013.01); *H04N 5/232* (2013.01); *H04N 5/23241* (2013.01); *H04N 5/77* (2013.01)

(56) References Cited

U.S. PATENT DOCUMENTS

| | | |
|---|---|---|
| 2005/0068423 A1 | 3/2005 | Bear et al. |
| 2006/0028558 A1 | 2/2006 | Sato et al. |
| 2008/0030588 A1 | 2/2008 | Boss et al. |
| 2008/0270652 A1 | 10/2008 | Jeansonne |
| 2009/0111517 A1 | 4/2009 | Chen |
| 2009/0256917 A1 | 10/2009 | Lin et al. |
| 2010/0191947 A1 | 7/2010 | Shin |
| 2011/0016335 A1 | 1/2011 | Hsieh |
| 2011/0195747 A1 | 8/2011 | Ladouceur |
| 2013/0138938 A1 | 5/2013 | Bang et al. |
| 2014/0016031 A1 | 1/2014 | Tsai et al. |
| 2014/0028777 A1 | 1/2014 | Koberling |

OTHER PUBLICATIONS

Yesimparnoid, "Possible to Completely Disable Cam on Laptop?," Forums: Tech/Special Interest: Computer Hardware Help, Broadband DSL Reports, Sep. 7, 2012, pp. 1-5.

ENABLEMENT AND DISABLEMENT OF CAMERAS

PRIORITY INFORMATION

This application is a continuation of U.S. National Stage application Ser. No. 15/506,623 filed on Feb. 24, 2017, which claims priority to International Application No. PCT/US2014/052855 filed Aug. 27, 2014. The contents of which are incorporated herein by reference in its entirety.

BACKGROUND

Consumers appreciate quality and value in their devices. They also appreciate ease of use and flexibility in configuring such devices. Designers and manufacturers of these devices may, therefore, endeavor to create and supply solutions that are directed to these objectives.

BRIEF DESCRIPTION OF THE DRAWINGS

The following detailed description references the drawings, wherein.

DETAILED DESCRIPTION

Electronic devices may include a camera that records images (still and/or video). Users of such electronic devices may utilize these images with applications such as, for example, video conferencing, email, and instant messaging. Unfortunately, however, hackers or other unauthorized persons may enable the camera on such an electronic device without a user's knowledge or permission. If this occurs, the camera may be utilized by such hackers or other unauthorized persons to record images of the end user and/or the location (e.g., home, office, car, etc.) in which the end user is utilizing the electronic device. These recorded images may be used, transmitted, forwarded, sent, distributed and/or displayed without the user's knowledge or permission. This may cause security, privacy and/or other concerns for at least some of the users of such electronic devices.

One way in which a camera of an electronic device may be disabled is to utilize a moveable door or other cover that blocks light from entering the lens of the camera to prevent recordation of images. One potential issue with such moveable doors or covers, however, is that they may require an electronic device to have a certain minimum thickness. This minimum thickness may prevent utilization of such moveable doors or covers in at least some electronic devices that are designed to be thin such as, for example, some tablets and phones. Moveable doors or covers may also add to the overall cost of an electronic device which at least some end users may not be able to afford or be willing to pay.

Another way in which a camera of an electronic device may be disabled is to utilize opaque tape to block light from entering the lens of the camera to prevent recordation of images. One potential issue with such opaque tape, however, is that, when removed, it may leave a residue on the lens of the camera which may degrade the quality (e.g., sharpness, contrast, color, etc.) of the images recorded by the camera. Another potential issue with such opaque tape is that it may not be readily available to an end user when he or she wants to disable the camera of his or her electronic device. An additional potential issue with such opaque tape is that it may inadvertently be placed over other components of an electronic device such as, for example, a microphone or speaker, thereby interfering with the operation of an electronic device.

An additional way in which a camera of an electronic device may be disabled is to utilize a driver (e.g., machine-readable instructions) of the camera to disable the camera to prevent recordation of images. A potential issue with the use of such camera driver to disable the camera is that such camera driver can be hacked or otherwise compromised to enable the camera on such an electronic device without a user's knowledge or permission.

Example implementations directed to securely disabling, as well as enabling, a camera of an electronic device are shown in FIGS. 1-10. These example implementations illustrated in FIGS. 1-10 also attempt to address the above-described potential technical challenges associated with other possible approaches to disable the camera of an electronic device.

As used herein, the term "electronic device" represents, but is not necessarily limited to, a computer, server, tablet, monitor, phone, personal digital assistant, kiosk, television, display, or combination thereof. As used herein, the term "camera" represents, but is not necessarily limited to, a device that records images, still and/or video, by utilizing a lens assembly, shutter, associated electronics, and a photosensitive member or film. Examples of a photosensitive member include, but are not limited to, a charge-coupled device (CCD) or a complementary metal-oxide semiconductor (CMOS).

As used herein, the term "processor" represents, but is not necessarily limited to, an instruction execution system such as a computer-based system, an application specific integrated circuit (ASIC), a computing device, a hardware and/or machine-readable instruction system, or any combination thereof, that can fetch or obtain the logic from a machine-readable non-transitory storage medium and execute the instructions contained thereon. "Processor" can also include any controller, state-machine, microprocessor, logic control circuitry, cloud-based utility, service or feature, any other analogue, digital and/or mechanical implementation thereof, or any combination of the forgoing. A processor may be a component of a distributed system.

As used herein, the term "distributed system" represents, but is not necessarily limited to, multiple processors and machine-readable non-transitory storage media in different locations or systems that communicate via a network, such as the cloud. As used herein, the term "cloud" represents, but is not necessarily limited to, computing resources (hardware and/or machine readable instructions) that are delivered as a service over a network (such as the internet).

As used herein, the term "machine-readable non-transitory storage medium" represents, but is not necessarily limited to, any medium that can contain, store, retain, or maintain programs, code, scripts, information, and/or data. A machine-readable non-transitory storage medium may include any one of many physical media such as, for example, electronic, magnetic, optical, electromagnetic, or semiconductor media. A machine-readable non-transitory storage medium may be a component of a distributed system. More specific examples of suitable machine-readable non-transitory storage media include, but are not limited to, a magnetic computer diskette such as floppy diskettes or hard drives, magnetic tape, a read-only memory (ROM), an erasable programmable read-only memory (EPROM), a flash drive or memory, a compact disc (CD), a digital video disk (DVD), or a memristor.

As used herein, the term "basic input and output system" (BIOS) represents, but is not necessarily limited to, a set of executable instructions in persistent memory (e.g., ROM, EPROM, flash drive, etc.) that control input and output operations of an electronic device and/or components (e.g., a camera) thereof. As used herein, the term "button" represents, but is not necessarily limited to, a mechanical, electrical, or electromechanical device that is actuable between at least two positions, states, or conditions. Examples of a button include, but are not necessarily limited to, a capacitive sensor, a pushbutton, a key, a photodiode, a proximity sensor, and an inductive sensor.

As used herein, the term "input device" represents, but is not necessarily limited to, a peripheral and any related driver or machine readable instructions used to provide data and/or control signals to an electronic device and/or components (e.g., a camera) thereof. Examples of an input device include, but are not limited to, a keyboard, keypad, mouse, pointer, trackball, or joystick. As used herein, the terms "include", "includes", "including", "have", "has", "having" and variations thereof, mean the same as the terms "comprise", "comprises", and "comprising" or appropriate variations thereof.

Figure 1:
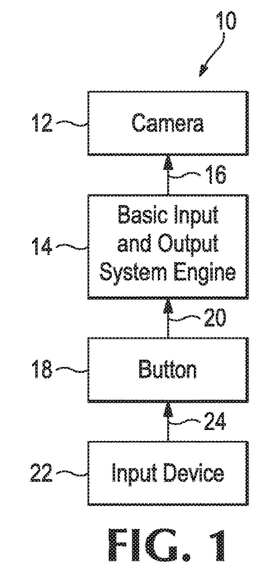
FIG. 1 is an example of an apparatus in accordance with an implementation.

An example of an apparatus 10 is shown in FIG. 1. Apparatus 10 may be part of an electronic device (not shown in FIG. 1). Apparatus 10 may be utilized to securely enable and disable a camera, as provided herein. As can be seen in FIG. 1, apparatus 10 includes a camera 12 to record an image and a basic input and output system engine 14 coupled to camera 12, for example by a Universal Serial Bus (USB) interface, as generally indicated by arrow 16. Basic input and output system engine 14 includes a first state to enable camera 12 to record an image, a second state to disable camera 12, and a third state that allows camera 12 to be enabled and disabled independent of basic input and output system engine 14. Basic input and output system engine 14 may represent any circuitry, processor, executable instructions, application programming interfaces (APIs), machine-readable non-transitory storage medium, or any combination thereof, that provides the above-described first, second, and third states.

As can additionally be seen in FIG. 1, apparatus 10 also includes a button 18 coupled to basic input and output system engine 14, as generally indicated by arrow 20. Button 18 is actuable between an on condition to enable camera 12 to record an image when basic input and output system engine 14 is in the third state and an off condition to disable camera 12 when basic input and output system engine 14 is in the third state. One way in which button 18 may disable camera 12 in the off condition is to remove power to camera 12. It should be noted, that in this example of apparatus 10, button 18 has no effect on camera 12 when basic input and output system engine 14 is in either the first or second states. This feature of basic input and output system engine 14 provides a first high level of security to disable camera 10 that helps to prevent hacking to enable camera 10. This feature of basic input and output system engine 14 also provides a first high level of security to enable camera 10 that helps to prevent hacking to disable camera 10.

As can further be seen in FIG. 1, apparatus 10 also includes an input device 22 both to selectively enable camera 12 to record an image when button 18 is in the on condition and disable camera 12 when button 18 is in the on condition. This selectivity may be provided, for example, by allowing a user to choose to enable or disable camera 12 via input device 22. It should be noted, that in this example of apparatus 10, input device 22 has no effect on camera 12 when button 18 is in the off condition. This feature of button 18 provides a second level of security to disable camera 10 that helps to prevent hacking of to enable camera 10. A third level of security is also provided by input device 22 itself which can selectively enable and disable camera 12.

Figure 2:
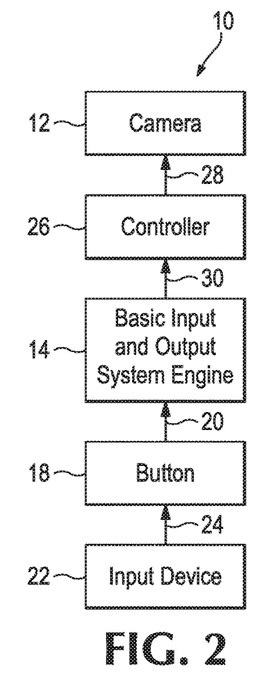
FIG. 2 is an example of additional elements of the apparatus of FIG. 1 in accordance with an implementation.

An example of an additional element of apparatus 10 is shown in FIG. 2. As can be seen in FIG. 2, apparatus 10 may also include a controller 26 to securely enable and disable camera 12. Controller 26 is coupled to camera 12, as generally indicated by arrow 28, and to basic input and output system engine 14, as generally indicated by arrow 30. Although not shown in FIG. 2, controller 26 is also coupled to button 18 and to input device 22. Controller 26 may include, for example, a Super I/O controller, a Southbridge controller, or other type of embedded controller and may be coupled to camera 12, for example, via a secure General Purpose Input/Output (GPIO) interface.

Figure 3:
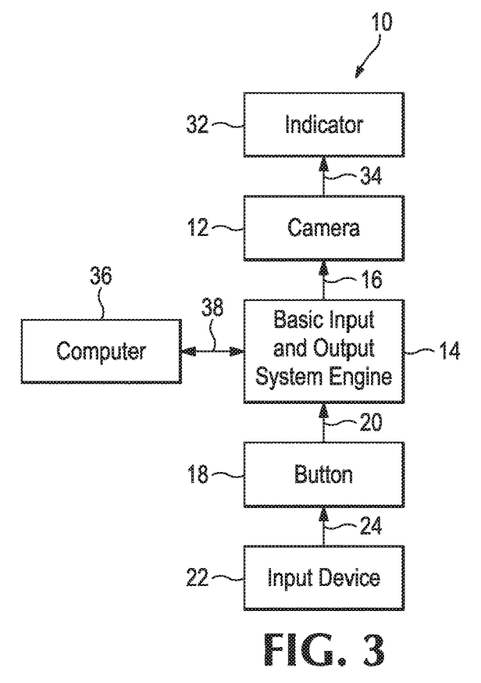
FIG. 3 is another example of an additional element of the apparatus of FIG. 1 in accordance with an implementation.

Another example of additional elements of apparatus 10 is shown in FIG. 3. As can be seen in FIG. 3, apparatus 10 may include an indicator 32 coupled to camera 12, as generally indicated by arrow 34, to signify whether camera 12 is enabled or disabled. Indicator 32 may include, for example, a light source, a buzzer, a multicolored light emitting diode (LED), or multiple different colored LEDs. As can also be seen in FIG. 3, apparatus 10 may additionally include a computer 36 that is coupled to Basic Input and Output System Engine 14, as generally indicated by double-headed arrow 38.

Figure 4:
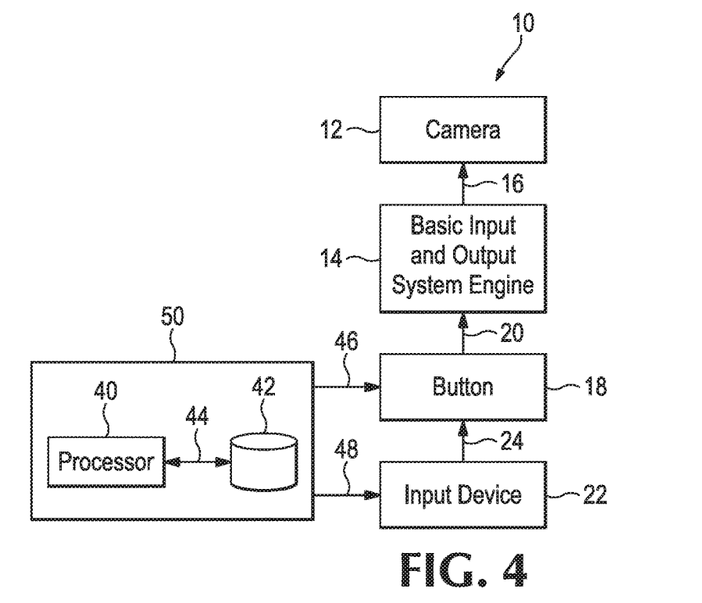
FIG. 4 is a further example of additional elements of the apparatus of FIG. 1 in accordance with an implementation.

A further example of additional elements of apparatus 10 is shown in FIG. 4. As can be seen in FIG. 4, apparatus 10 may additionally include a processor 40 and a machine-readable non-transitory storage medium 42 including instructions executable by processor 40, as generally indicated by double-headed arrow 44, to disable camera 12 via button 18, as generally indicated by arrow 46, and/or to disable camera 12 via input device 22, as generally indicated by arrow 48. Non-transitory storage medium 42 may also include additional instructions executable by processor 12 to enable camera 12 via button 18 and/or input device 22. Processor 40 and non-transitory storage medium 42 may be components of an electronic device 50.

Figure 5:
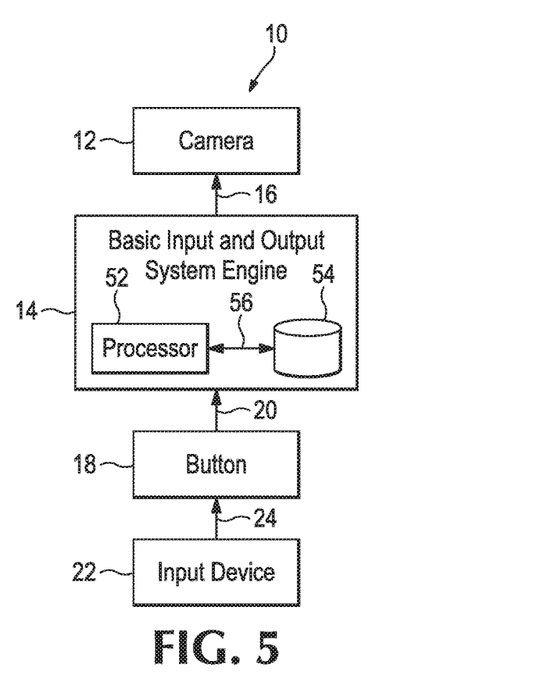
FIG. 5 is yet a further example of additional elements of the apparatus of FIG. 1 in accordance with an implementation.

Yet a further example of additional elements of apparatus 10 is shown in FIG. 5. As can be seen in FIG. 5, basic input and output system engine 14 of apparatus 10 may include a processor 52 and a machine-readable non-transitory storage medium 54 including instructions executable by processor 52, as generally indicated by double-headed arrow 56, to enable camera 12 and to disable camera 12. Machine-readable non-transitory storage medium 54 also includes instructions executable by processor 52 to allow camera 12 to be enabled and disabled by, for example, button 18 and input device 22 when basic input and output system engine 14 is in the third state, as discussed above.

Figure 6:
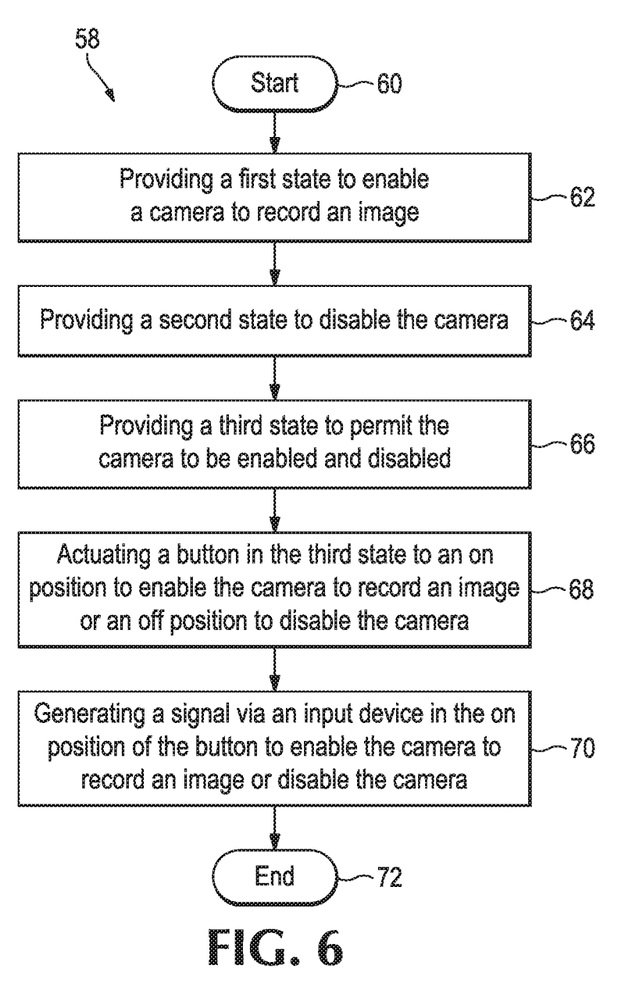
FIG. 6 is an example of a method in accordance with an implementation.

An example of a method 58 is shown in FIG. 6. Method 58 may be utilized to securely enable and disable a camera, as provided herein. For example, at least a portion of method 58 may be utilized in apparatus 10. As can be seen in FIG. 6, method 58 starts or begins 60 by providing a first state to enable a camera to record an image, as indicated by block 62, providing a second state to disable the camera, as indicated by block 64, and providing a third state to permit the camera to be enabled and disabled, as indicated by block 66. Blocks 62, 64, and 66 may be performed, for example, by a basic input and output system engine, such as basic input and output system engine 14.

Method 58 continues by actuating a button in the third state to an on position to enable the camera to record an image or an off position to disable the camera, as indicated by block 68. One way in which the button may disable the camera in the off condition is to remove power to the camera. Method 58 further continues by generating a signal via an input device in the on position of the button to enable the camera to record an image or disable the camera, as indicated by block 70. Method 58 then ends 72.

Figure 7:
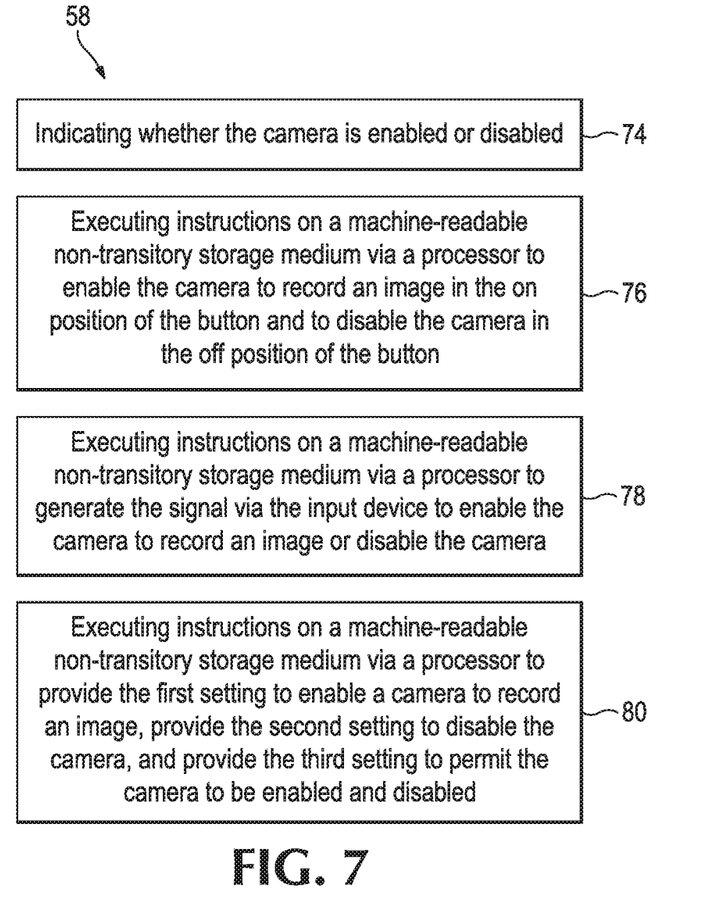
FIG. 7 is an example of additional elements of the method of FIG. 6 in accordance with an implementation.

An example of additional elements of method 58 is shown in FIG. 7. As can be seen in FIG. 7, method 58 may include indicating whether the camera is enabled or disabled, as shown in block 74. Alternatively or additionally, method 58 may include executing instructions on a machine-readable non-transitory storage medium via a processor to enable the camera to record an image in the on position of the button and to disable the camera in the off position of the button, as indicated by block 76. Method 58 may alternatively or additionally include executing instructions on a machine-readable non-transitory storage medium via a processor to generate the signal via the input device to enable the camera to record an image or disable the camera, as indicated by block 78.

The first state to enable a camera to record an image may include a first setting, the second state to disable the camera may include a second setting, and the third state to permit the camera to be enabled and disabled may include a third setting. In such cases, method 58 may further include executing instructions on a machine-readable non-transitory storage medium via a processor to provide the first setting to enable a camera to record an image, provide the second setting to disable the camera, and provide the third setting to permit the camera to be enabled and disabled, as indicated by block 80.

Figure 8:
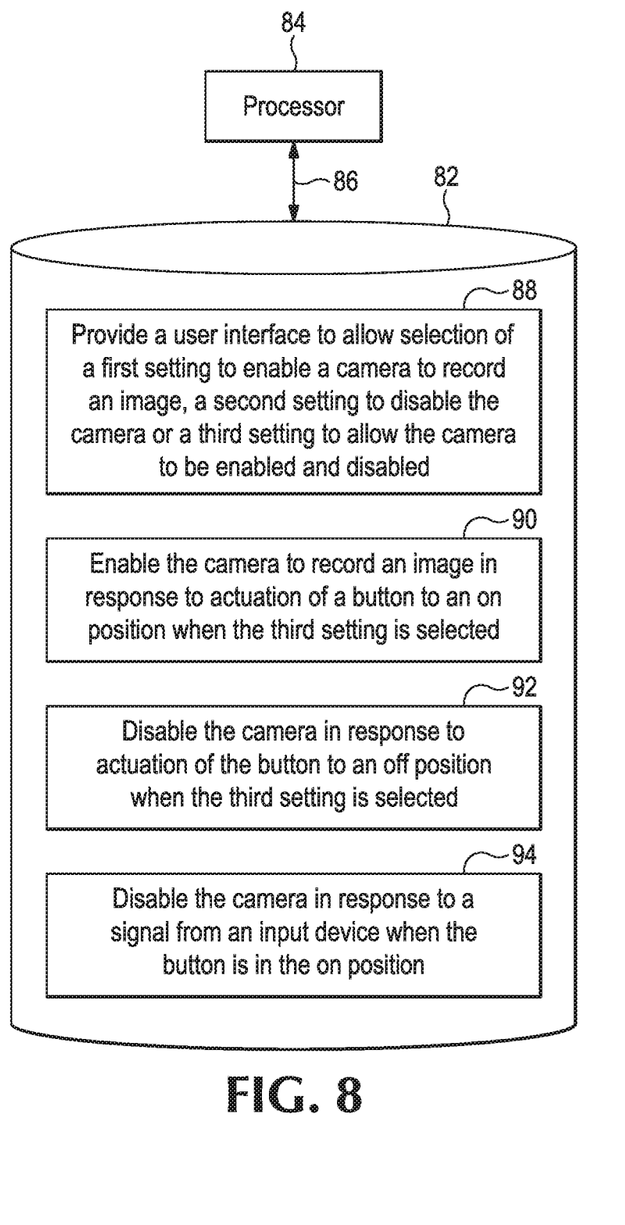
FIG. 8 is an example of a machine-readable non-transitory storage medium including instructions executable by a processor in accordance with an implementation.

An example of a machine-readable non-transitory storage medium 82 including instructions executable by a processor 84, as generally indicated by double-headed arrow 86, is shown in FIG. 8. The instructions on non-transitory storage medium 82 may be executed by processor 84 to securely enable and disable a camera, as provided herein. For example, the instructions on non-transitory storage medium 82 may be utilized in apparatus 10. As another example, the instructions on non-transitory storage medium 82 may perform at least one of the elements of method 58.

As can be seen in FIG. 8, non-transitory storage medium 82 includes instructions 88 executable by processor 84 to provide a user interface to allow selection of a first setting to enable a camera to record an image, a second setting to disable the camera, or a third setting to allow the camera to be enabled and disabled. As can also be seen in FIG. 8, non-transitory storage medium 82 includes instructions 90 executable by processor 84 to enable the camera to record an image in response to actuation of a button to an on position when the third setting is selected and instructions 92 to disable the camera in response to actuation of the button to an off position when the third setting is selected. As can additionally be seen in FIG. 8, non-transitory storage medium 82 includes instructions 94 executable by processor 84 to disable the camera in response to a signal from an input device when the button is in the on position.

Figure 9:
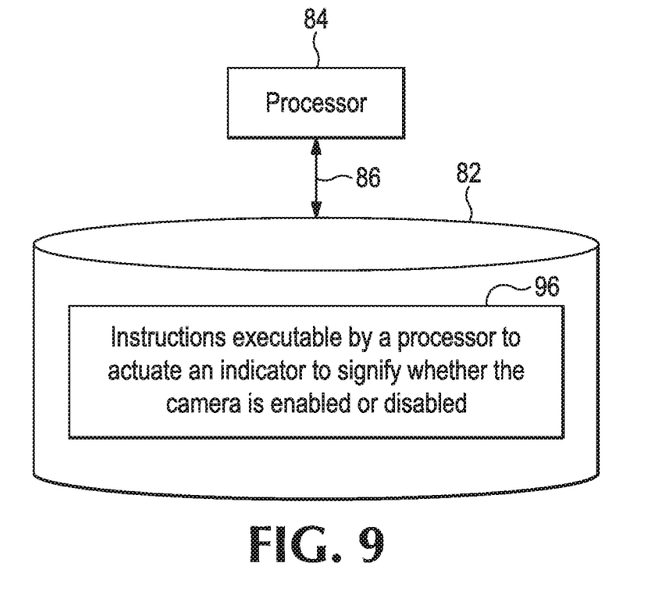
FIG. 9 is an example of additional instructions executable by a processor included on or in the machine-readable non-transitory storage medium of FIG. 8 in accordance with an implementation.

An example of additional instructions executable by processor 84 included on or in machine-readable non-transitory storage medium 82 is shown in FIG. 9. As can be seen in FIG. 9, non-transitory storage medium 82 may include instructions 96 executable by processor 84 to actuate an indicator to signify whether the camera is enabled or disabled.

Figure 10:
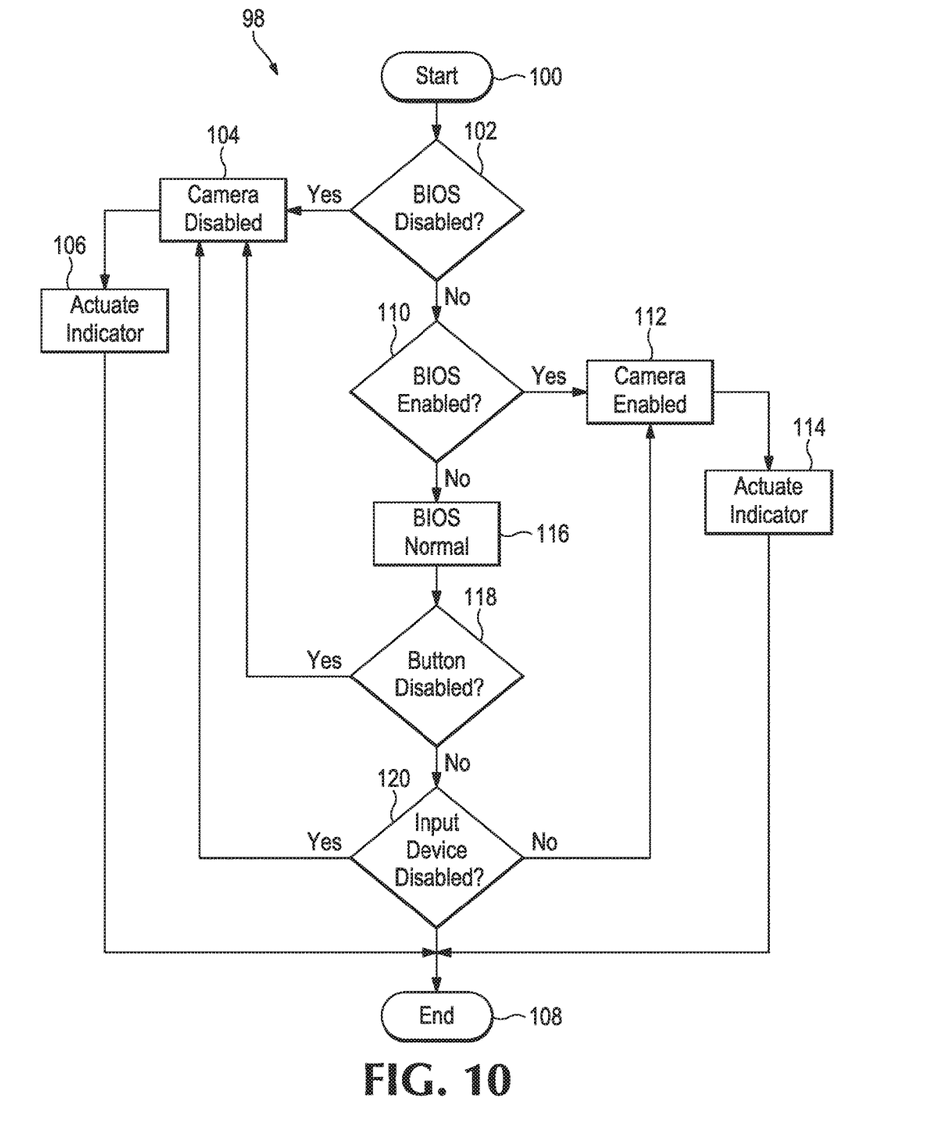
FIG. 10 is an example of a flowchart in accordance with an implementation.

An example of a flowchart 98 is shown in FIG. 10. Flowchart 98 represents a way or technique to securely enable and disable a camera, as provided herein. For example, apparatus 10, method 58 and/or the instructions on machine-readable non-transitory storage medium 82 may utilize at least a portion of the technique illustrated in flowchart 98. As can be seen in FIG. 10, flowchart 98 starts 100 by determining whether a Basic Input and Output System (BIOS) used to at least partially control a camera is disabled 102. If yes, then the camera is disabled 104, an indicator is actuated 106 to indicate that the camera is disabled, and flowchart 98 ends 108. If the Basic Input and Output System (BIOS) used to at least partially control the camera is not disabled, then flowchart 98 continues by determining whether the Basic Input and Output System (BIOS) is enabled 110. If yes, then the camera is enabled 112, an indicator is actuated 114 to indicate that the camera is enabled, and flowchart 98 ends 108. If the Basic Input and Output System (BIOS) used to at least partially control a camera is not enabled, then flowchart 98 continues as if the Basic Input and Output System (BIOS) is normal 116 (e.g., neither specifically set to enable or disable the camera).

Flowchart 98 continues by determining whether a button is disabled 118. It the button is disabled, then the camera is disabled 104, an indicator is actuated 106 to indicate that the camera is disabled, and flowchart 98 ends 108. If the button is not disabled, then flowchart 98 continues by determining whether an input device is disabled 120. If the input device is disabled, then the camera is disabled 104, an indicator is actuated 106 to indicate that the camera is disabled, and flowchart 98 ends 108. If the input device is not disabled, then the camera is enabled 112, an indicator is actuated 114 to indicate that the camera is enabled, and flowchart 98 ends 108.

Although several drawings have been described and illustrated in detail, it is to be understood that the same are intended by way of illustration and example. These examples are not intended to be exhaustive or to be limited to the precise form disclosed. Modifications, additions, and variations may well be apparent.

Additionally, reference to an element in the singular is not intended to mean one, unless explicitly so stated, but rather means at least one. Furthermore, unless specifically stated, any method elements, flowchart elements and/or instructions of a machine-readable non-transitory storage medium are not limited to the sequence or order described and illustrated. Moreover, no element or component is intended to be dedicated to the public regardless of whether the element or component is explicitly recited in the following claims.

What is claimed is:

1. An apparatus, comprising:
a camera to record an image, wherein the camera is enabled and disabled, independent of a basic input and output system (BIOS) engine available to enable the camera and disable the camera, by:
a button actuatable between an on condition and an off condition; and
an input device when the button is actuated to the on condition.

2. The apparatus of claim 1, further comprising a controller coupled to the camera, the BIOS engine, the actuatable button, and the input device to securely enable and disable the camera.

3. The apparatus of claim 1, further comprising an indicator to signify whether the camera is enabled or disabled.

4. The apparatus of claim 1, wherein the BIOS engine is configurable between a first state, a second state, and a third state.

5. The apparatus of claim 4, wherein the camera is enabled to record an image when the BIOS is configured to the first state.

6. The apparatus of claim 4, wherein the camera is disabled from recording an image when the BIOS is configured to the second state.

7. The apparatus of claim 4, wherein the camera is allowed to be enabled and disabled by the button actuatable between the on condition and the off condition when the BIOS is in the third state.

8. A method, comprising:
toggling a camera between enabled and disabled based on a condition of an actuatable button, responsive to a basic input and output system (BIOS) engine available to enable and disable the camera being configured to allow the camera to be enabled and disabled independent of the BIOS engine; and
toggling the camera between enabled and disabled based on a signal from an input device, responsive to the actuatable button being in an on condition.

9. The method of claim 8, further comprising determining whether the BIOS engine is configured to enable the camera to record and image, disable the camera, or allow the camera to be enabled and disabled independent of the BIOS engine.

10. The method of claim 8, further comprising actuating an indicator to signify whether the camera is enable or disabled.

11. The method of claim 8, further comprising interrupting power to the camera when the actuatable button is in an off condition.

12. The method of claim 8, further comprising ignoring the signal from the input device specifying whether the camera is enabled or disabled, responsive to the actuatable button being in an off condition.

13. A machine-readable non-transitory storage medium comprising instructions executable by a processor to:
toggle a camera between enabled and disabled based on a condition of an actuatable button when a basic input and output system (BIOS) engine, that otherwise enables and disables the camera, is configured to allow the camera to be enabled and disabled based on the condition of the actuatable button; and
toggle the camera between enabled and disabled based on a signal from an input device when the actuatable button is in an on condition.

14. The machine-readable non-transitory storage medium of claim 13, including instructions executable by the processor to disable the ability to toggle the camera between enabled and disabled based on the condition of the actuatable button when the BIOS engine is not configured to allow the camera to be enabled and disabled based on the condition of the actuatable button.

15. The machine-readable non-transitory storage medium of claim 13, including instructions executable by the processor to disable the ability to toggle the camera between enabled and disabled based on a signal from an input device when the actuatable button is in an off condition.

* * * * *